(12) United States Patent  
Ganapathy

(10) Patent No.: US 8,769,612 B2
(45) Date of Patent: Jul. 1, 2014

(54) PORTABLE DEVICE ASSOCIATION

(75) Inventor: Narayanan Ganapathy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 719 days.

(21) Appl. No.: 12/191,724

(22) Filed: Aug. 14, 2008

(65) Prior Publication Data

US 2010/0043056 A1 Feb. 18, 2010

(51) Int. Cl.
 *H04L 29/00* (2006.01)
(52) U.S. Cl.
 USPC ............... 726/3; 713/155; 713/156; 713/157; 713/158; 713/159; 380/247; 380/248; 380/249; 380/250
(58) Field of Classification Search
 USPC ........................ 713/155–159; 380/247–250
 See application file for complete search history.

(56) References Cited

U.S. PATENT DOCUMENTS

| | | | |
|---|---|---|---|
| 5,799,086 A | 8/1998 | Sudia | |
| 6,016,746 A | 1/2000 | Lake et al. | |
| 6,122,639 A | 9/2000 | Babu et al. | |
| 6,438,600 B1 | 8/2002 | Greenfield et al. | |
| 6,487,660 B1 | 11/2002 | Vanstone et al. | |
| 6,515,575 B1 | 2/2003 | Kataoka | |
| 6,941,148 B2 | 9/2005 | Hansmann et al. | |
| 6,976,253 B1 | 12/2005 | Wierman et al. | |
| 7,266,595 B1 | 9/2007 | Black et al. | |
| 7,620,667 B2 | 11/2009 | Rollin et al. | |
| 7,971,049 B2 | 6/2011 | TeNgaio et al. | |
| 8,099,761 B2 | 1/2012 | Ganapathy | |
| 8,285,674 B2 | 10/2012 | Landry et al. | |
| 8,341,249 B2 | 12/2012 | Rakowski et al. | |
| 2003/0100307 A1 | 5/2003 | Wolochow et al. | |
| 2004/0128345 A1 | 7/2004 | Robinson et al. | |
| 2005/0114711 A1* | 5/2005 | Hesselink et al. | ............ 713/201 |
| 2005/0208803 A1 | 9/2005 | Rohatgi et al. | |
| 2005/0289265 A1 | 12/2005 | Illowsky et al. | |

(Continued)

FOREIGN PATENT DOCUMENTS

| | | |
|---|---|---|
| CN | 102119391 | 7/2011 |
| EP | 1832998 | 9/2007 |

(Continued)

OTHER PUBLICATIONS

International search report and written opinion for PCT Application No. PCT/US2009/051154, dated Feb. 11, 2010.

(Continued)

*Primary Examiner* — Ghazal Shehni
(74) *Attorney, Agent, or Firm* — Aaron Chatterjee; Andrew Sanders; Micky Minhas

(57) ABSTRACT

A technique that enables a portable device to be automatically associated with a plurality of computers. Information that a computer can use to authenticate a portable device and establish a trusted relationship prior to creating an association with the portable device is created and stored in a data store that is accessible by a plurality of computers and is associated with a user of the portable device. When a computer discovers such a portable device with which it is not yet associated, the computer can identify a user logged into the computer and use information identifying the user to retrieve authentication information that is device independent and is expected to be presented by the portable device to authenticate it and allow automatic association.

20 Claims, 11 Drawing Sheets

(56) References Cited

U.S. PATENT DOCUMENTS

| | | | |
|---|---|---|---|
| 2006/0064493 | A1 | 3/2006 | Hammell et al. |
| 2006/0085639 | A1* | 4/2006 | Phillips et al. ............... 713/168 |
| 2006/0095954 | A1 | 5/2006 | Buckley et al. |
| 2006/0123147 | A1 | 6/2006 | Yasuhara |
| 2006/0200856 | A1 | 9/2006 | Salowey et al. |
| 2006/0218549 | A1 | 9/2006 | Hsu et al. |
| 2006/0223516 | A1 | 10/2006 | Fan et al. |
| 2006/0253894 | A1* | 11/2006 | Bookman et al. ............... 726/2 |
| 2007/0118891 | A1 | 5/2007 | Buer |
| 2007/0214272 | A1 | 9/2007 | Isaacson |
| 2007/0232272 | A1 | 10/2007 | Gonsalves et al. |
| 2007/0274422 | A1 | 11/2007 | Shivaji-Rao et al. |
| 2007/0283049 | A1 | 12/2007 | Rakowski et al. |
| 2008/0076389 | A1 | 3/2008 | Lee et al. |
| 2008/0229389 | A1 | 9/2008 | Singh et al. |
| 2010/0040233 | A1 | 2/2010 | Ganapathy |
| 2011/0225640 | A1 | 9/2011 | Ganapathy |
| 2012/0290694 | A9 | 11/2012 | Marl et al. |

FOREIGN PATENT DOCUMENTS

| | | | |
|---|---|---|---|
| EP | 1862902 | | 12/2007 |
| EP | 1873668 | | 1/2008 |
| EP | 2158784 | * | 6/2008 |
| EP | 2158784 | | 3/2010 |
| JP | 2000003336 | | 1/2000 |
| JP | 2006114048 | | 4/2006 |
| JP | 2006526208 | | 11/2006 |
| JP | 2009055259 | | 3/2009 |
| JP | 2010503319 | | 1/2010 |
| JP | 2011530960 | | 12/2011 |
| KR | 20110057149 | | 5/2011 |
| RU | 61491 | | 2/2007 |
| RU | 2011105187 | | 8/2012 |
| WO | WO-02067483 | | 8/2002 |
| WO | WO 2004090781 | A1 | 10/2004 |

OTHER PUBLICATIONS

Pals, et al., UML-Based Modeling of Roaming with Bluetooth Devices http://www.swe.informatik.uni-goettingen.de/publications/HP_ZD_JG_HN/uml_based_bt_modelling.pdf 4 Roaming for Bluetooth, 2003.

Panayiotou, et al., mPERSONA: Personalized Portals for the Wireless User: An Agent http://softsys.cs.uoi.gr/dbglobe/publications.Samara-Monet-F.pdf, Dec. 2004.

Maniatis, et al., The Mobile People Architecture http://hpl.hpl.hp.com/personal/Mary_Baker/publications/maniatis99mobile.pdf, Jul. 1999.

Linsky, et al., Simple Pairing Whitepaper http://www.bluetooth.com/NR/rdonlyres/0A0B3F36-D15F-4470-85A6-F2CCFA26F70F/0/SimplePairing_WP_V10r00.pdf, dated Aug. 3, 2006.

International search report and written opinion for PCT Application No. PCT/US2009/051628, dated Feb. 26, 2010.

"Extended European Search Report", EP Application No. 09807046.9, (Jul. 9, 2012), 5 pages.

"Final Office Action", U.S. Appl. No. 12/191,752, (Jun. 29, 2011), 6 pages.

"Foreign Office Action", Chinese Application No. 200980131660.0, (Feb. 16, 2013), 9 pages.

"Foreign Office Action", EP Application No. 09807046.9, (Jul. 26, 2012), 1 pages.

"Non-Final Office Action", U.S. Appl. No. 12/191,752, (Jan. 24, 2011), 6 pages.

"Non-Final Office Action", U.S. Appl. No. 13/113,384, (Jan. 4, 2013), 9 pages.

"Notice of Allowance", U.S. Appl. No. 12/191,752, (Sep. 19, 2011), 6 pages.

"End User Configuration", *Cisco Unified Communications Manager Administration Guide, Release 7.1(2)*, Available at <http://www.cisco.com/en/US/docs/voice_ip_comm/cucm/admin/7_1_2/ccmcfg/b08user.html>,(May 31, 2009), 18 pages.

"Non-Final Office Action", U.S. Appl. No. 13/113,384, (Jun. 20, 2013), 10 pages.

"Foreign Office Action", Chinese Application No. 200980131660.0, (Jul. 5, 2013), 8 pages.

"Foreign Office Action", Japanese Application No. 2011-523028, (Aug. 5, 2013), 4 pages.

"Final Office Action", U.S. Appl. No. 13/113,384, Oct. 28, 2013, 11 pages.

"Foreign Notice of Allowance", JP Application No. 2011-523031, Nov. 5, 2013, 4 pages.

"Foreign Office Action", JP Application No. 2011-523031, Jul. 30, 2013, 4 pages.

"Foreign Office Action", RU Application No. 2011105187, Jul. 17, 2013, 5 pages.

"Extended European Search Report", EP Application No. 09807046.9, Jul. 9, 2012, 5 pages.

"Foreign Office Action", CN Application No. 200980131666.8, Oct. 22, 2013, 6 pages.

"Foreign Office Action", CN Application No. 200980131666.8, Apr. 3, 2013, 8 pages.

"Foreign Notice of Allowance", RU Application 2011105187, Oct. 23, 2013, 8 Pages.

"Foreign Office Action", CN Application No. 200980131660.0, Nov. 13, 2013, 8 Pages.

"Foreign Office Action", CN Application No. 200980131660.0, Mar. 25, 2014, 8 Pages.

"International Search Report and Written Opinion", Application No. PCT/US2013/060489, Jan. 20, 2014, 11 pages.

"Non-Final Office Action", U.S. Appl. No. 13/113,384, Mar. 6, 2014, 9 pages.

* cited by examiner

PORTABLE DEVICE ASSOCIATION

BACKGROUND

The invention relates to systems and methods for securely associating (or pairing) portable electronic devices with one or more computing devices.

Increasingly, users operate many different types of portable electronic devices with their computers (e.g., wireless headphones, digital cameras, personal digital assistants (PDAs), mobile phones, mouses, etc.). Many portable electronic devices are enabled with short-range wireless technologies, such as Bluetooth, ultra-wide band (UWB), wireless Universal Serial Bus (USB), and Near Field Communication (NFC), while others may communicate with the computing device via a physical wired connection.

Short-range wireless technologies and wired connections allow communications only between devices located within close proximity of each other. Due to this limitation of physical proximity, security threats are somewhat mitigated. That is, an attacking device needs to be physically connected to a target computing device, or within its transmission range, to be able to intercept and/or inject communications. Nonetheless, security features typically are employed to ensure that a computing device only associates and communicates with trusted and authorized devices.

Conventionally, a process is performed to ensure that a portable device is trusted before it is associated with a computing device. For example, a computing device enabled with a wireless technology may carry out a discovery protocol to obtain a list of other devices that are enabled with the same technology and are within communication range. The computing device may then initiate, either automatically or at the request of a user, a communication session with one of the discovered devices. To establish trust between the two devices, the user typically is prompted to interact with one or both of the devices. For example, each device may display a numerical value and the user is prompted to enter "yes" on one or both of the devices if the two displayed numerical values match, to verify that the user is in control of both devices so that the portable device is trusted. Such a user-aided authentication process is generally referred to as "manual pairing" as it requires an affirmative manual action by a user.

As part of the conventional manual pairing process, once the user confirms that the connection is between trusted devices, the devices store security information (e.g., cryptographic keying materials) for use in subsequent communications so that future association between the devices can be performed automatically by the devices without user action. Thus, if the same two devices discover each other in the future, the stored security information may be retrieved and exchanged to allow the devices to recognize one another as trusted, without having to perform another manual pairing procedure.

SUMMARY

Aspects of the present invention are directed to improved techniques for automatically associating a portable device (e.g., a wireless device, such as a mobile phone, MP3 player, wireless headset), with two or more different computers. Using conventional techniques, a portable device needed to be manually paired with a computer to establish a trusted relationship between them to facilitate subsequent automatic association, and the manual pairing process needed to be performed separately for each computer with which a user desired to use a portable device. For example, a user that purchases a new wireless headset and seeks to use it with both a work computer and a home computer conventionally needs to go through a manual pairing process with each of those computers to establish a trusted relationship with the wireless headset. As part of the manual pairing process, authentication information is exchanged between the computer and the portable device (e.g., the wireless headset) that can be used in the future to allow the devices to authenticate each other and form an automatic association. Therefore, after a device has been manually paired with a computer once, when the devices are brought into communication range in the future, they can authenticate each other to establish a trusted relationship and automatically establish communication.

A disadvantage of conventional techniques is that they require a separate manual pairing operation for a portable device with every computer with which it is to be used, which can be cumbersome for the user, particularly for users that employ a large number of portable devices with multiple computers. In accordance with one embodiment of the invention, the need to perform multiple manual pairing operations is overcome. This can be accomplished in any of several ways. In one aspect, during a manual pairing operation with a first computer, authentication information is established between the portable device and a user of the computer with which the device is being manually paired. The authentication information is then stored in a data store that is globally accessible by any number of computers. Thus, after the authentication information has been established, when the user seeks to use the portable device with any new computer (including a computer with which it has not previously been manually paired), that computer can retrieve authentication information from the globally accessible store based upon the identity of the user logged into the computer, and can use that authentication information to enable the new computer and the portable device to automatically authenticate each other and establish an association without requiring that they be manually paired. This is advantageous, as a user need only manually pair a portable device with one computer, and enable the device to be automatically associated thereafter with any computer on which the user logs in, rather than requiring that the user go through subsequent manual pairing operations with every computer that the user seeks to use the portable device with.

In an alternate aspect, the authentication information can be established and provided in a globally accessible store without requiring that the portable device be manually paired with any particular computer.

Another embodiment of the invention is directed to a protocol for authenticating a portable device to a computer using authentication information that is tied to a user of the computer, rather than to a specific computer itself, so that the authentication information can be employed by any computer on which the user is logged in.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

As discussed above, conventional device association protocols rely on manual user intervention to initially establish trust between two devices. Authentication information (e.g., cryptographic keying materials) established or exchanged during an earlier manual pairing procedure can then be used later to enable two devices that have been associated in the past to be associated automatically without user intervention. However, a manual pairing procedure must be carried out at least once to establish the exchange of the required security information for any two devices that have never been previously associated.

Applicants have appreciated that some users employ two or more different computing devices (e.g., one at home and another at work) with which the user may wish to associate the same one or more portable device(s) (e.g., headphones, MP3 player, mobile phone, etc.). Applicants have further appreciated that the manual pairing process may be time-consuming and cumbersome for device users, particularly if it need be repeated multiple times for the same portable device to associate the portable device with multiple computing devices.

Figure 1:
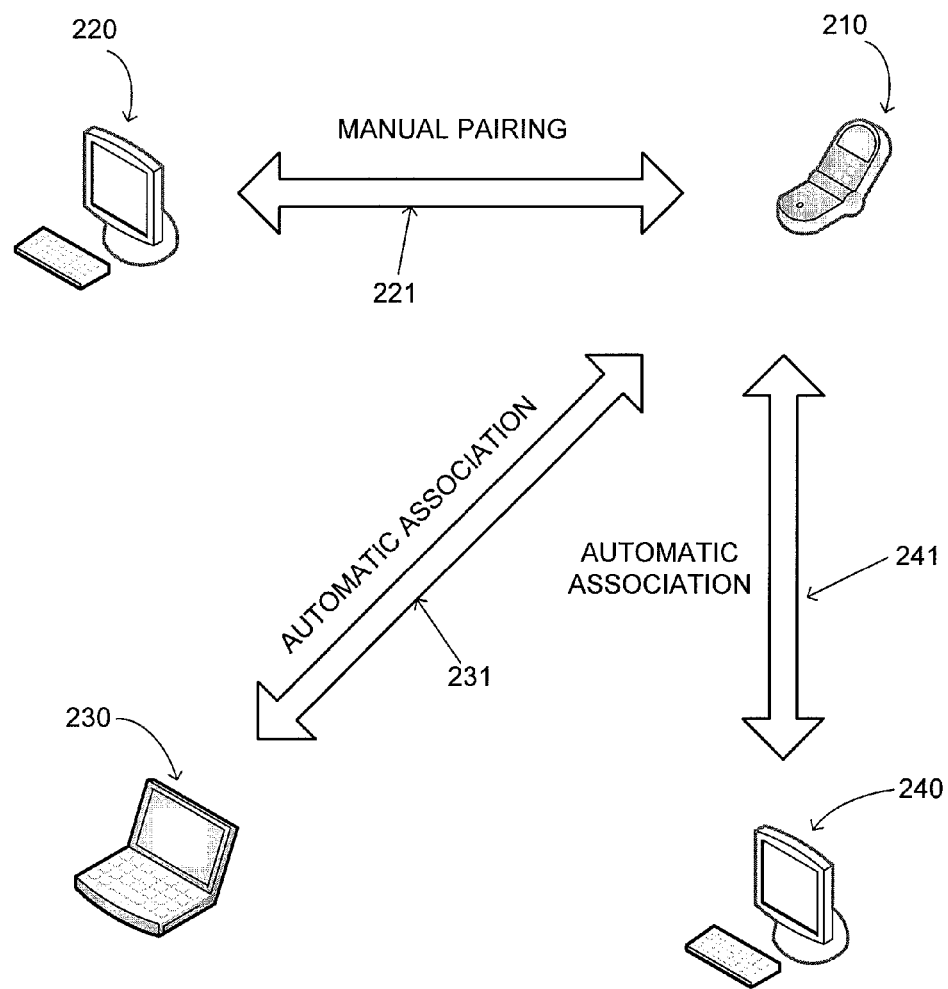
FIG. 1 illustrates a manual pairing operation of a mobile device with a single computer and thereafter automatic association with additional computers in accordance with one embodiment of the present invention.

Thus, in accordance with one embodiment of the invention shown conceptually in FIG. 1, a user may pair a portable device (e.g., a mobile phone 210) manually once (e.g., at 221) with one computer (e.g., home desktop 220), and the portable device later may be associated automatically with other computers (e.g., laptop 230 as shown at 231 or office desktop 240 as shown at 241) used by the same user. As used herein, reference to the portable device being associated automatically indicates that a user of the computer and the portable device need not take any action to authenticate the portable device to the computer or the computer to the portable device and facilitate association therebetween.

The aspect of the invention relating to enabling automatic association between a portable device and a computer with which the portable device was not previously manually paired can be implemented in any suitable manner, as it is not limited to any particular implementation technique. In accordance with one illustrative embodiment of the present invention, a technique is employed for use with a portable device capable of being associated with two or more computers. Authentication information is created that authenticates the portable device, and the authentication information is stored in a data store that is accessible by the two or more computers, and in a manner that associates the authentication information with a user of the portable device. Once the authentication information is created and stored in a data store accessible to a computer with which the portable device has not previously been associated, that computer can access and use the authentication information to authenticate the portable device automatically, without requiring a manual pairing operation. This can be accomplished in any suitable manner.

For example, in accordance with another embodiment of the invention, when a computing device discovers at least one portable device that it has not been associated with, the computing device may identify the user logged into the computing device, use information identifying the logged-in user to retrieve authentication information for the portable device, and use the retrieved authentication information to authenticate the portable device and automatically associate it with the computing device.

As should be appreciated from the foregoing, Applicants have appreciated that a disadvantage of conventional techniques for associating a portable device with multiple computing devices is that when authentication information is exchanged between a portable device and a computing device, the information that can be used to authenticate the portable device in the future to enable automatic association conventionally is stored by the computing device in a manner wherein it is accessible only locally to that computing device. In accordance with one embodiment of the present invention, authentication information for a portable device is stored in a manner that makes it more globally accessible to one or more computing devices, even computing devices not used to communicate with the portable device to establish the authentication information. As a result, when the portable device is discovered for the first time by such a computing device, the computing device can access the data store, retrieve the authentication information, and use it to authenticate and automatically associate the portable device, even though the computing device never previously engaged in a manual pairing with the portable device. This is shown conceptually in FIG. 2, wherein a portable device 901 can be associated, at different times as indicated by the dotted lines 903a and 903b, with two or more computers 905a and 905b. Authentication information 909 that can be used to authenticate the portable device 901 is stored in a data store 907 that is accessible to two or more of the computers 905a-b. Thus, when the portable device 901 is discovered by any of the computers 905*a-b*, including one with which the portable device 901 had not been previously manually paired to establish the authentication information, the computer 905*a-b* can access the data store 907 to retrieve the authentication information 909 and use it to authenticate and automatically associate the portable device 901 with the computer.

Figure 2:
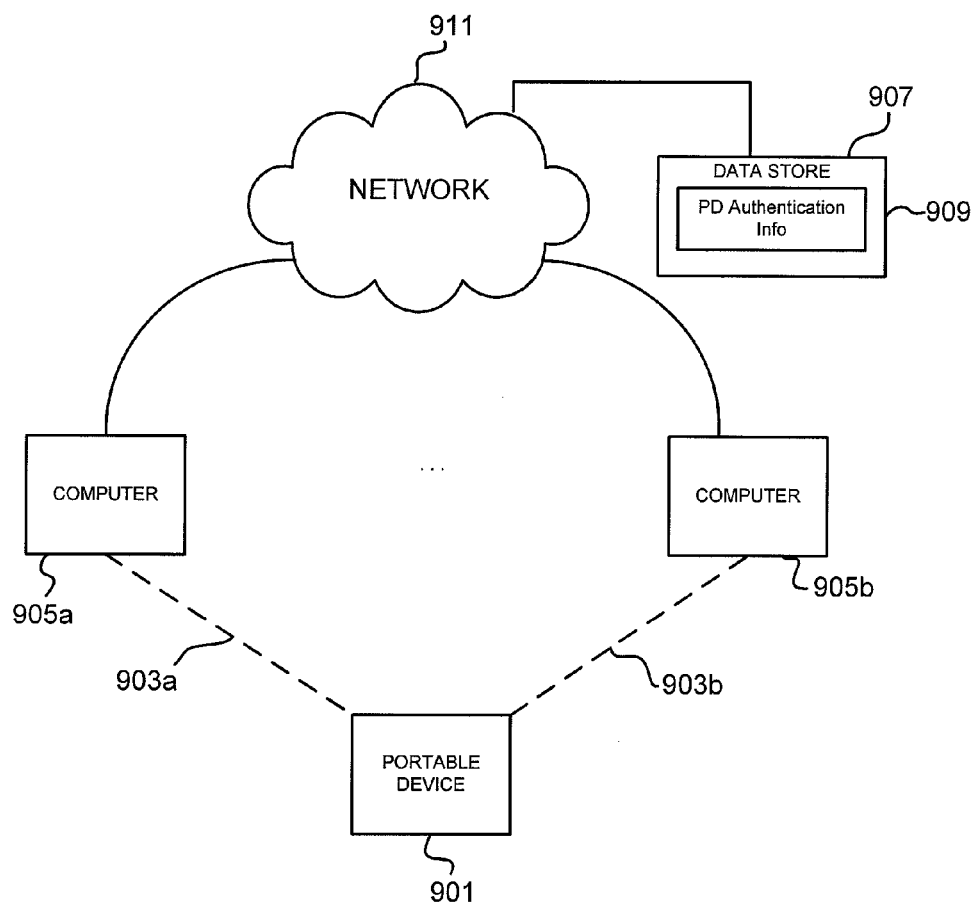
FIG. 2 illustrates a computer system including a globally accessible data store including information for one or more computers to automatically authenticate and associate a portable device in accordance with one embodiment of the present invention.

In the configuration shown in FIG. 2, the data store 907 is illustrated as being accessible, via a network 911, to each of the computers 905*a-b*. In accordance with one embodiment of the invention, the network 911 can be any suitable network (e.g., the Internet) and the data store 907 can be associated with a computing device (e.g., a database server or other type of computing device) that is distinct from any of the computers 905*a-b*. However, it should be appreciated that the aspects of the present invention described herein are not limited in this respect. For example, the data store 907 may be provided on or associated with one of the computers 905*a-b*, and may be accessed by the computers 905*a-b* via a USB flash key or any other suitable communication medium.

In accordance with one embodiment of the present invention discussed below, the authentication information 909 is developed through a manual pairing of the portable device 901 with one of the computers 905*a-b* and is then stored in the data store 907, which may be a data store on the computer that performed the manual pairing or another computer. However, it should be appreciated that aspects of the present invention described herein are not limited in this respect, as the authentication information can be developed and stored in the data store 907 in any suitable manner. For example, in an alternate embodiment of the present invention, authentication information (e.g., keying materials) may be generated without performing a manual pairing operation. Thereafter, the portion(s) of the keying materials to be used by the portable device during automatic association may be stored directly on the portable device in any suitable manner, and the portion(s) of the keying materials to be used by the one or more computers may be stored in a globally accessible store.

Figure 3:
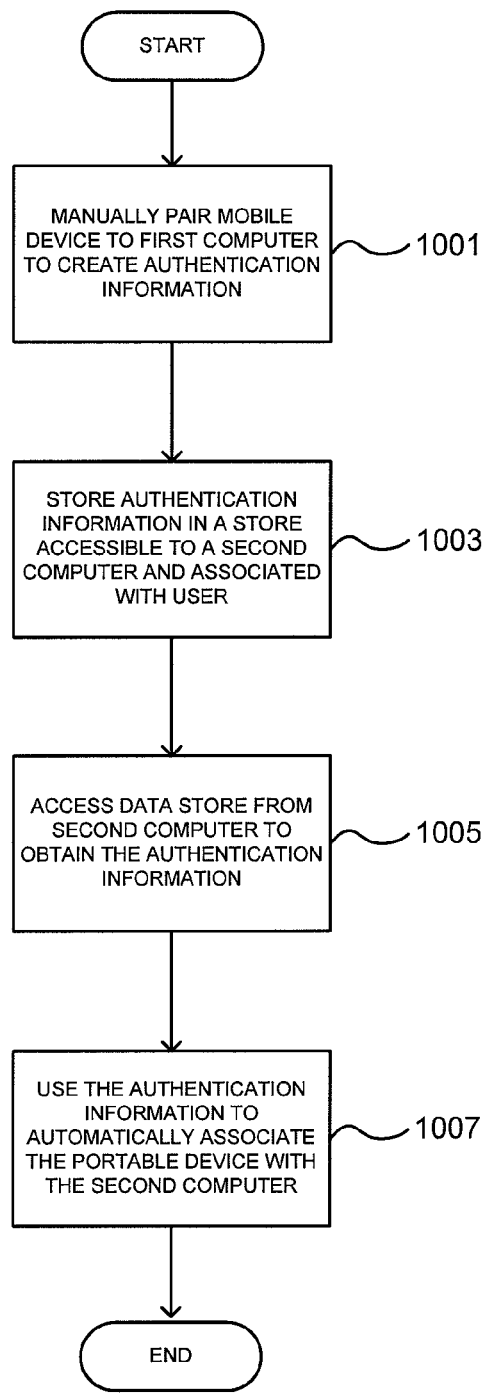
FIG. 3 is a flow chart of an exemplary process for creating and using authentication information to automatically associate the portable device with a computer, in accordance with one embodiment of the present invention.

As should be appreciated from the foregoing, one embodiment of the present invention is directed to a process of the type shown in FIG. 3 for associating a portable device with a computer. Initially, in act 1001, the portable device is manually paired with a first computer (e.g., computer 905*a* in FIG. 2) to create authentication information (e.g., authentication information 909) that can be used to authenticate the portable device. It should be appreciated that the authentication information alternatively can be established in other ways as mentioned above. In act 1003, the authentication information is stored in a data store (e.g., data store 907) that is accessible to another computer (e.g., computer 905*b*) and is associated with the user of the portable device 901. In this respect, in accordance with one embodiment of the present invention, the authentication information is stored in the data store in a manner that associates it with a user of the portable device so that a computer that discovers the portable device can identify the user of the computer and use that information to identify what authentication information to retrieve from the data store. In this respect, in accordance with some embodiments of the present invention, the data store (e.g. data store 907) may include authentication information for any number of portable devices and/or any number of one or more users, so that when information for multiple users' devices is stored, the identity of the user of the computer that discovers the portable device can be used to identify the appropriate authentication information for that user's devices. However, it should be appreciated that not all embodiments are limited to using information identifying the user to identify what authentication information to use to authenticate the portable device, as any suitable technique can be employed.

In act 1005, a computer other than the one that was manually paired with the portable device to create the authentication information (e.g., a second computer such as computer 905*b*) may access the data store to retrieve the authentication information (e.g., authentication information 909). This act can be performed in response to discovery by that computer of the portable device, or at any other suitable time.

Finally, in act 1007, the computer can use the retrieved authentication information (e.g., authentication information 909) to authenticate the portable device 901, and to automatically associate the portable device with the computer (e.g., 905*b*) when it is successfully authenticated. In this manner, the portable device may be automatically associated with a computer (e.g., computer 905*b*) without ever having been manually paired with that computer.

As should be appreciated from the foregoing, the process illustrated in FIG. 3 differs from conventional techniques for associating a portable device with one or more computers both in the way authentication information is stored (e.g., in a data store accessible to other computers as opposed to only locally for use by a computer that performed a manual pairing operation to obtain the authentication information) and in the process performed by a computer when it first discovers a portable device that it had not previously been associated with (e.g., by obtaining authentication information from a data store rather than performing a manual pairing operation).

Figure 4:
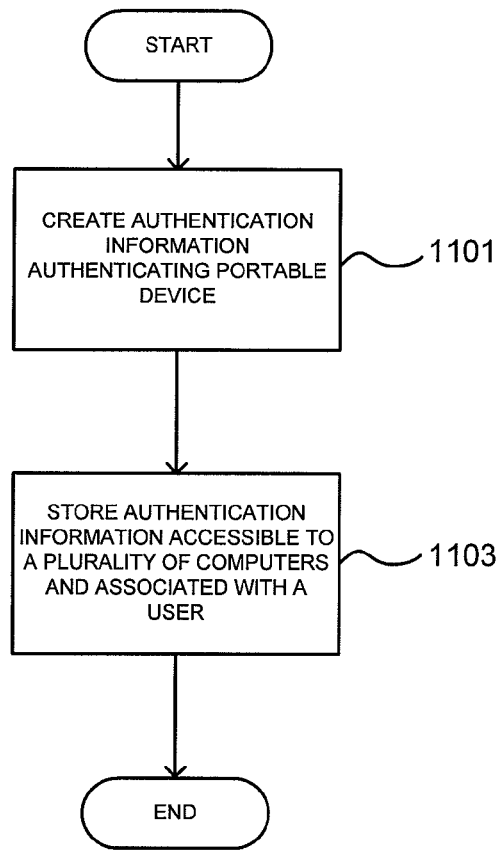
FIG. 4 is a process for creating authentication information for a portable device and for storing it in a manner that makes it accessible to a plurality of computers in accordance with one embodiment of the present invention.

In this respect, FIG. 4 illustrates a process in accordance with one embodiment of the present invention that involves making authentication information for a portable device available to one or more computers not previously associated with the portable device. In act 1101, authentication information is created that can be used to authenticate the device. As discussed above, the authentication information can be created by manually pairing the portable device with a computer, or in any other suitable manner, as aspects of the present invention described herein are not limited to any particular technique for creating the authentication information.

In act 1103, the authentication information is stored in a manner that makes it accessible to a plurality of computers, as opposed to being stored in a localized manner accessible only to a single computer, using any suitable technique, examples of which are described herein. In accordance with one embodiment of the present invention, the authentication information is stored in a manner that associates it with a user of the portable device to facilitate retrieval as discussed above.

Figure 5:
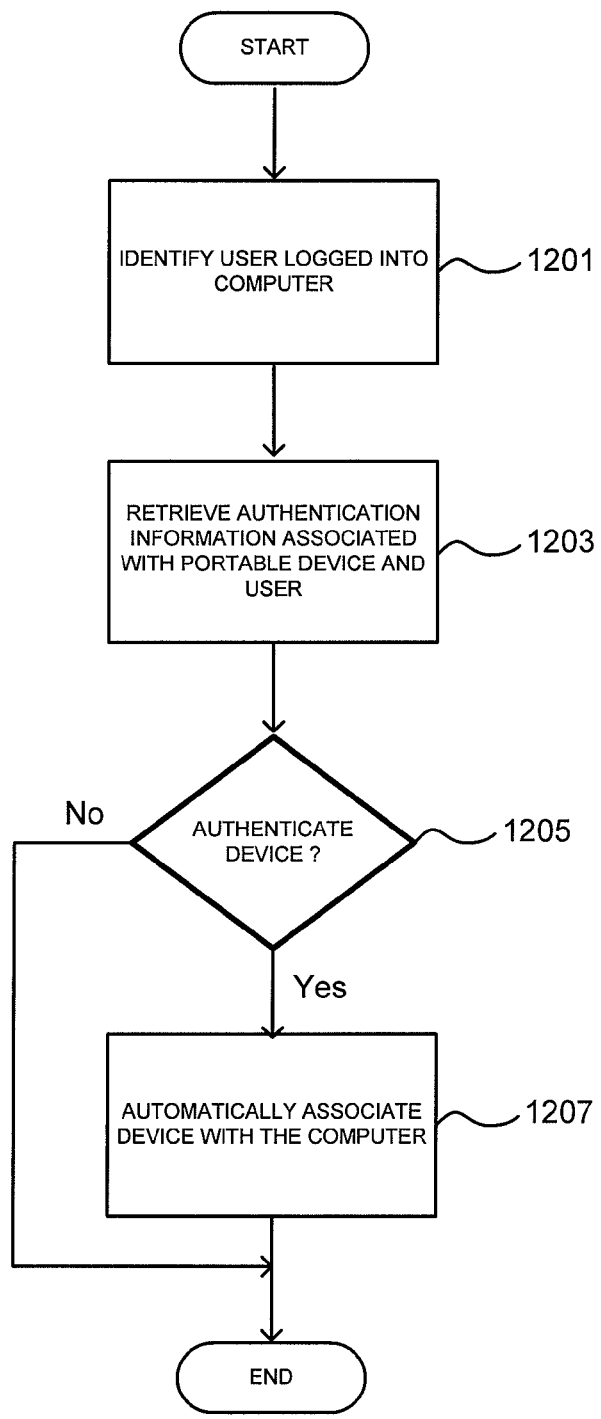
FIG. 5 is a process for automatically associating a portable device with a computer by identifying a user logged into the computer and retrieving authentication information associated with the user to authenticate the portable device in accordance with one embodiment of the invention.

FIG. 5 illustrates a process that a computer may perform in accordance with one embodiment of the present invention to automatically associate itself with a portable device. The process of FIG. 5 may be initiated in response to the computer discovering the portable device or in response to any other suitable event. In act 1201, the process identifies a user logged into the computer. Thereafter, in act 1203, the process retrieves from a data store authentication information that is associated with the portable device and also is associated with the user that is identified in act 1201 as being logged into the computer. This can be done in any suitable manner, examples of which are discussed herein. In act 1205, the computer uses the authentication information to make a determination of whether the portable device (e.g., portable device 901) can successfully authenticate itself as a trusted device. This can be accomplished in any suitable manner, examples of which are described below. When it is determined at act 1205 that the portable device cannot authenticate itself as a trusted device, the process terminates and the portable device is not associated with the computer. Alternatively, when it is determined at act 1205 that the portable device can successfully authenticate itself as a trusted device, the process proceeds to act 1207, wherein the portable device is automatically associated with the computer such that no manual pairing operation need be performed.

As discussed above, the authentication information (e.g., 909 in FIG. 2) that can be stored in a data store accessible to multiple computers can take any suitable form. For example, the authentication information can comprise some information that is not publicly accessible (referred to as a "secret" herein for convenience) and that a computer using the authentication information to authenticate a portable device would expect that only the trusted portable device associated with the authentication information would be capable of providing.

Alternatively, in accordance with other embodiments of the present invention, the authentication information can include one or more keying materials that can be used by a computer that retrieves the keying material(s) to communicate in accordance with one or more security protocols with a portable device. For example, in one non-limiting embodiment, a portion of the keying material(s) may be used by the computer to verify a digital signature accompanying a communication, thereby ascertaining that the communication was indeed transmitted by a trusted portable device, as only a trusted portable device associated with the authentication information would have been capable of sending such a communication along with a valid digital signature. In another example, a portion of the keying material(s) may be used by the computer to decrypt a communication that has been encrypted by the portable device.

In this specification, the phrase "keying material" is used to refer to any information that may be used for the purpose of securing communication, for instance, for preserving secrecy and integrity of messages and/or for authenticating message sources. Examples of keying materials include public-private key pairs (used in asymmetric key encryption and electronic signatures), secret keys (used in symmetric key encryption), nonces (i.e., random values that are used once and then discarded), and checksums/hashes (typically generated by cryptographic hash functions and used for different purposes such as integrity checks and/or commitments). These are merely examples of keying materials that may be used to establish the authentication information used in accordance with some embodiments described herein. In addition, it should be appreciated that the authentication information stored in the data store can embody any information that enables a computer accessing it to authenticate the portable device in any suitable way, as aspects of the present invention described herein are not limited to employing any particular type of keying material or other authentication information.

In accordance with one embodiment of the present invention, steps are taken to not only authenticate the portable device to a computer before allowing automatic association, but to similarly authenticate the computer and/or a user thereof to the portable device before the portable device allows the computer to be automatically associated with it. Thus, some embodiments of the invention described below implement techniques for authenticating a computer and/or a user thereof to a portable device in addition to authenticating the portable device to the computer before enabling automatic association between the two. However, it should be appreciated that all aspects of the present invention are not limited in this respect, as the techniques described herein can be employed to authenticate only the portable device to the computer to enable automatic association.

Conventional techniques for automatic device association require that each computer store a separate set of keying materials (developed during manual pairing) for each portable device with which it is capable of automatic association. Likewise, a portable device conventionally must store a separate set of keying materials (also developed during manual pairing) for each computer with which the device may be automatically associated. This is because in existing device association techniques, the keying materials developed as a result of manually pairing two devices is device specific and tied to the devices.

Figure 6:
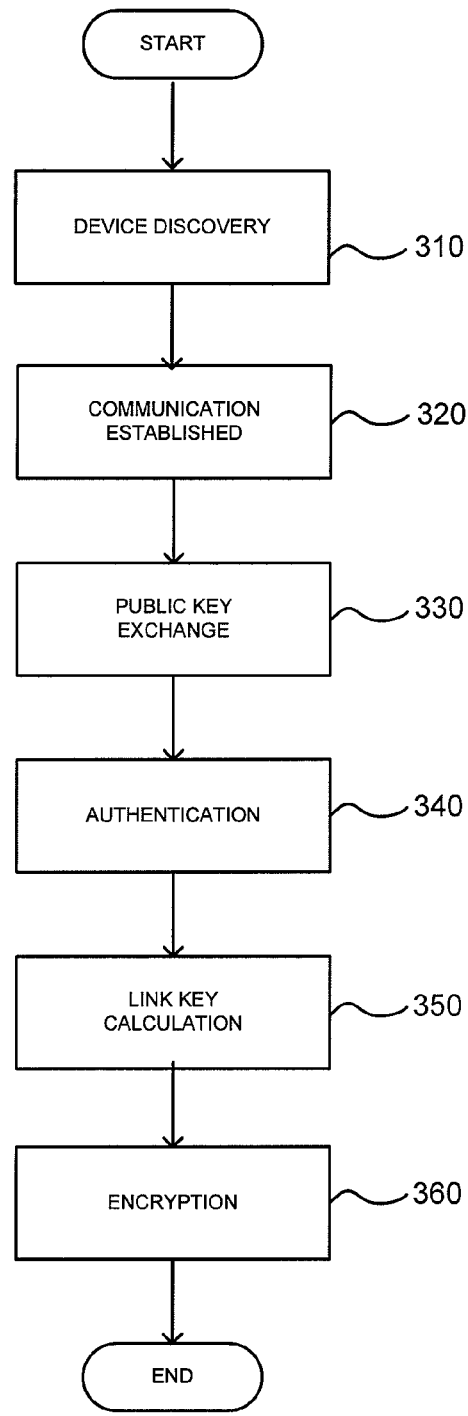
FIG. 6 is a conventional process for performing authenticated device association.

As an example of a conventional association technique, FIG. 6 shows a simplified version of the Bluetooth Simple Pairing protocol. Initially, in act 310, two Bluetooth-enabled devices discover each other, and at act 320 they establish an unsecured communication channel. Next, the two participating devices exchange their public keys in act 330. In act 340, confirmation values are computed based on the exchanged public keys and/or Bluetooth addresses of the participating devices, and in act 350, a link key for maintaining the pairing is computed using the Bluetooth addresses of the participating devices, and is used to engage in encrypted communication in act 360.

As should be appreciated from the foregoing, the keying materials established using Bluetooth Simple Pairing are tied to the Bluetooth addresses of the participating devices. As a result, keying materials established between a pair of devices typically are not reused to associate another pair of devices, even if the two pairs have one device in common and/or the keying materials can be transferred from one device to another. For example, if keying materials established for a portable device and a first computer having a first Bluetooth address were used to attempt to associate a second computer and the portable device, the portable device may refuse to associate with the second computer, as the keying materials are tied to the first Bluetooth address and the portable device may recognize that the second computer has a different Bluetooth address. Thus, in accordance with one embodiment of the invention, cryptographic keying materials are employed that are device independent so that they can be shared easily and securely by different computers for the purpose of device association.

In one embodiment, the device independent keying materials are created, via a manual pairing procedure or otherwise, not between the portable device and any particular computer, but rather between the portable device and a user thereof. Therefore, unlike the keying materials formed using conventional device association protocols, the keying materials are not tied to any particular computer and therefore can be used to associate the portable device with any computer or group of computers. In accordance with one embodiment of the present invention, an association protocol is employed that uses the device-independent keying materials to associate a portable device with a computer. However, the keying materials, association protocol and other techniques described herein are not limited in this respect, and can be used to perform association between any two or more devices of any type including not only between a portable device and a device conventionally referred to as a computer (e.g., a laptop or personal computer), but between any two devices of any type. In addition, it should be appreciated that the reference to a computer or computing device (which terms are used interchangeably herein) is used herein to refer to any device having a programmed processor, including devices that may not conventionally be referred to as a computer. In addition, the techniques described herein may be used to perform associations among groups of devices. For example, the techniques described herein may be used in a broadcast or multicast scenario to enable a group of devices that share a first set of keying materials to be associated with another group of devices that share a second set of keying materials.

The device independent keying materials used in accordance with one embodiment can be made available to any computer for the purpose of associating a portable device. This can be accomplished in any suitable way. For example, the keying materials may be stored on a first computer with which the portable device is associated, and later transferred to a second computer at the user's request or in response to an automatic request from the second computer. Alternatively, the first computer may store the keying materials in a globally accessible store, so that a second computer may retrieve the keying materials therefrom. The globally accessible store may be on the first computer or a separate computer, and/or may be retrieved using any suitable interface, such as a web interface, a network file system interface, or any other suitable interface.

In accordance with one embodiment of the present invention described below, the device-independent keying materials to be used by multiple computers to associate a portable device are generated using unique identifiers (IDs) for both the user and the portable device. These unique identifiers can be established in any suitable manner, as the aspects of the present invention that employ these IDs to generate the keying materials are not limited in this respect. For example, the unique user ID can be a user's e-mail address, or a unique identifier provided via a service that provides unique identifiers, such as Windows Live ID available from Microsoft Corporation or any other service, or can be provided in any other suitable way. Similarly, the portable device can be identified via a unique identifier using any suitable technique, such as a Globally Unique Identifier (GUID) or any other suitable technique.

Figure 7:
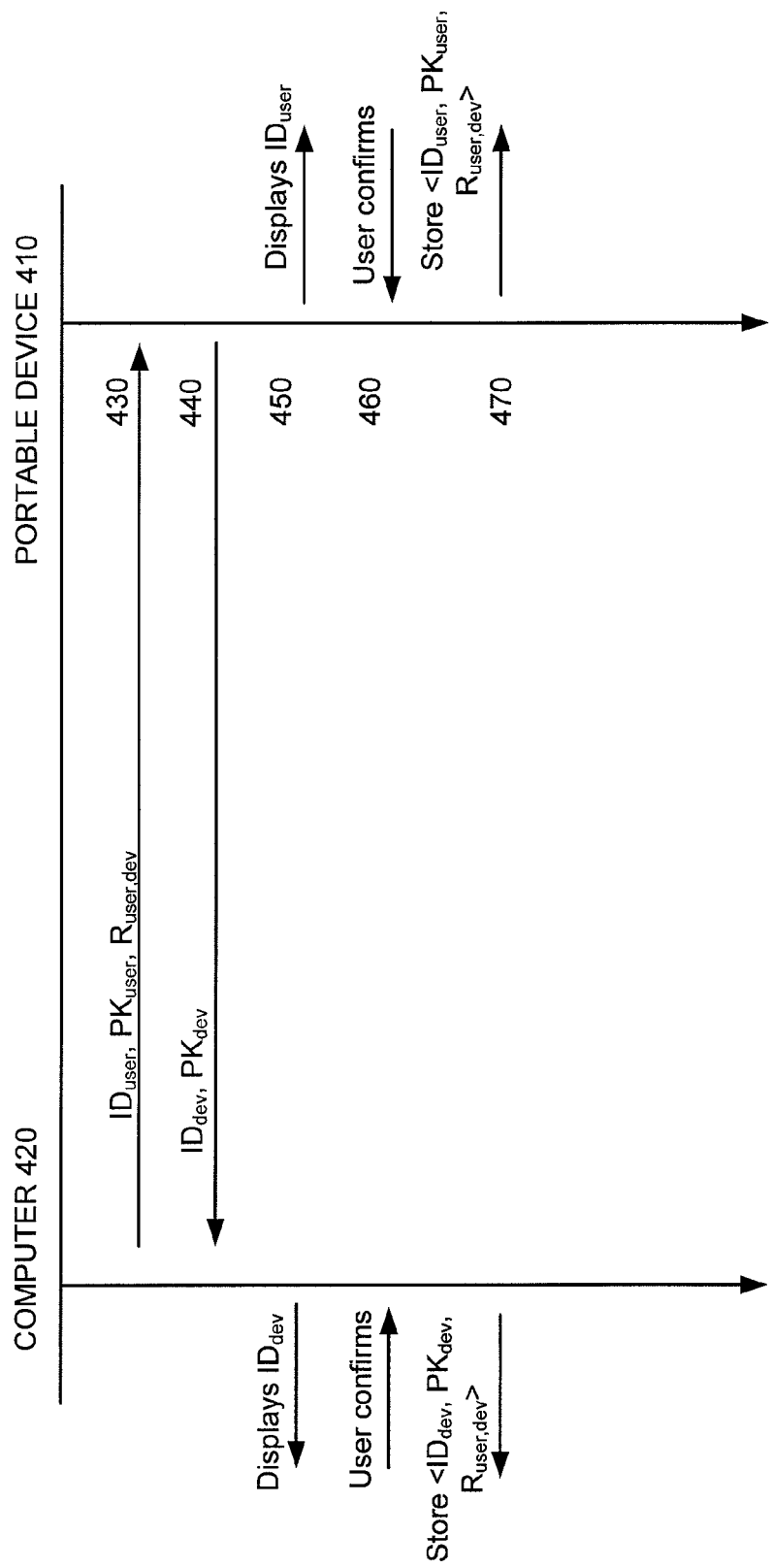
FIG. 7 illustrates a process for manually pairing a computer to a portable device to create authentication information in accordance with one embodiment of the present invention.

Referring to FIG. 7, a process for manually pairing a portable device and a computer to establish device independent keying materials in accordance with one embodiment of the invention is illustrated in the form of a message chart. The process illustrated in FIG. 7 may begin after the portable device 410 and the computer 420 have discovered each other and have established a communication channel (e.g., an unsecured channel) in any suitable way. In the case of Bluetooth, for instance, the portable device 410 may have been placed in discoverable mode, and the computer 420 may have performed a scan to discover portable device 410 and may have initiated communication with portable device 410. Depending on the underlying method of communication, the exchange of communications illustrated in FIG. 7 may be performed during discovery and communication establishment, or during any suitable phase of communication between the two participating devices, as the invention is not limited in this respect.

In act 430, the computer 420 sends to the portable device 410 a first collection of information comprising an ID of the user ($ID_{user}$), a public key of the user ($PK_{user}$), and a random value generated for the association between the user and the portable device 410 ($R_{user,dev}$). The random value $R_{user,dev}$ is a piece of secret information that uniquely identifies an association between the user and the portable device 410. As discussed below, in accordance with one embodiment, $R_{user,dev}$ can be used to provide for security against a replay attack where a device seeks to improperly represent itself to establish automatic association.

However, it should be appreciated that the aspect of the present invention relating to a protocol to develop device independent keying materials is not limited to employing an extra piece of secret information such as $R_{user,dev}$ to guard against such an attack, as it may be omitted in some embodiments (e.g., if it is believed that the risk of such an attack is minimal). In addition, while the secret information is provided as a random number in one embodiment, it should be appreciated that any technique may be employed for establishing the secret information, as it is not limited to being a random number.

In one embodiment, a technique is employed to secure the transfer of the random number to the portable device. This can be done in any suitable way. For example, the transfer may take place via a USB device or a proximity wireless technology such as NFC, which has such a small transmission range that makes it practically impossible for another device to eavesdrop.

In act 440, the portable device 410 sends to the computer 420 a second collection of information comprising an ID of portable device 410 ($ID_{dev}$) and a public key of portable device 410 ($PK_{dev}$).

It should be appreciated that the techniques described herein are not limited to the exact combination of information exchanged during acts 430 and 440, nor to the number and order of communications shown in FIG. 7. For example, in one embodiment, the public keys may be sent between the computer 420 and the portable device 410 in certificates signed by an authority trusted by both the portable device 410 and the computer 420 to increase security, although this is not required. Furthermore, the information may be exchanged in any suitable manner, including decomposing acts 430 and 440 into multiple communications, and interleaving the communications in any suitable order.

In act 450, the portable device 410 displays on a display thereof at least some of the information provided by the computer 420 or derived therefrom, and the computer 420 similarly displays on a display thereof at least some of the information received from the portable device 410 or information derived therefrom to enable the user to confirm that the devices communicating are the correct devices and thereby establish that the communication is trusted. The information to be displayed is information that the user will be capable of verifying as having been provided by the other device to establish the trusted relationship. This can be accomplished in any suitable manner, examples of which are discussed below. For example, in one embodiment, the portable device 410 may display $ID_{user}$ and computer 420 may display $ID_{dev}$, and the user may have similarly been able to view from each device the ID that is transmitted to the other (e.g., the user may have been able to view $ID_{dev}$ on the portable device 410 and $ID_{user}$ from the computer 420) so that the user can verify that each device properly displays an identifier transmitted from the other.

Some devices (e.g., portable device 410) may lack a display or user interface that enables the display of information to provide a user the opportunity to visualize and confirm it. In accordance with one embodiment of the present invention, for such a device, the step of displaying information on that portable device may be omitted. Omitting that step may preclude the user from verifying that the portable device is exchanging information with the desired computer (e.g., 420). However, if the user is willing to accept the decreased security that results therefrom, the step can be omitted entirely. Alternatively, in such a circumstance, the communication medium used to exchange information between the portable device and the computer can be one that leaves no doubt that the two trusted devices are communicating. For example, the communication can be performed over a wired connection, through a portable communication medium such as a USB flash device, or using a communication technology such as NFC that has a very small transmission range and eliminates the possibility of a third computing device intercepting and/or injecting communication.

In act 460, the user confirms that the pairing and exchange of information has occurred between trusted devices by interacting with one or both of portable device 410 and computer 420. For example, if the IDs displayed in act 450 are correct, the user may operate a user interface of the portable device 410 and computer 420 to indicate this. When so indicated, the computer 420 and the portable device 410 will proceed in the manner described below. Alternatively, if the user fails to indicate that the information has been exchanged between trusted devices, the process will terminate and the association information will not be stored.

It should be appreciated that the user may be apprised of the information expected to be displayed on the computer 420 and the portable device 410 in any suitable manner. For example, each device (e.g., portable device 410 and computer 420) may provide a user interface whereby it can display its own ID or other information to the user so that the user can make note of the information expected to be seen on the other device to verify the trusted relationship. For example, as mentioned above, the portable device may display its ID to the user on its own user interface so that the user can know what information to expect to be displayed by the computer 420 to confirm that the computer 420 is pairing with the correct portable device 410. However, this is merely an example, as the user may be apprised of the information expected to be displayed on one or both of the pairing devices in any suitable manner.

As discussed above, when the user confirms that the relationship is trusted by interacting with one or both of the portable device 410 and the computer 420, the portable device 410 and the computer 420 store at least some of the information received in steps 430 and 440 and/or information derived therefrom. For example, portable device 410 may store the profile <$ID_{user}$, $PK_{user}$, $R_{user,dev}$> in any internal storage (e.g., memory) available in the portable device, while the computer 420 may store the profile <$ID_{dev}$, $PK_{dev}$, $R_{user,dev}$> in a globally accessible store at a location associated with the user. Additional and/or alternative information may be obtained and stored in these profiles, as the techniques described herein are not limited to any specific information being exchanged. Other suitable types of information can also be employed. An illustrative example of a manner in which the profile created in FIG. 7 can be used to authenticate the portable device with one or more computers (including computers other than computer 420) and facilitate automatic association is described below.

Figure 8:
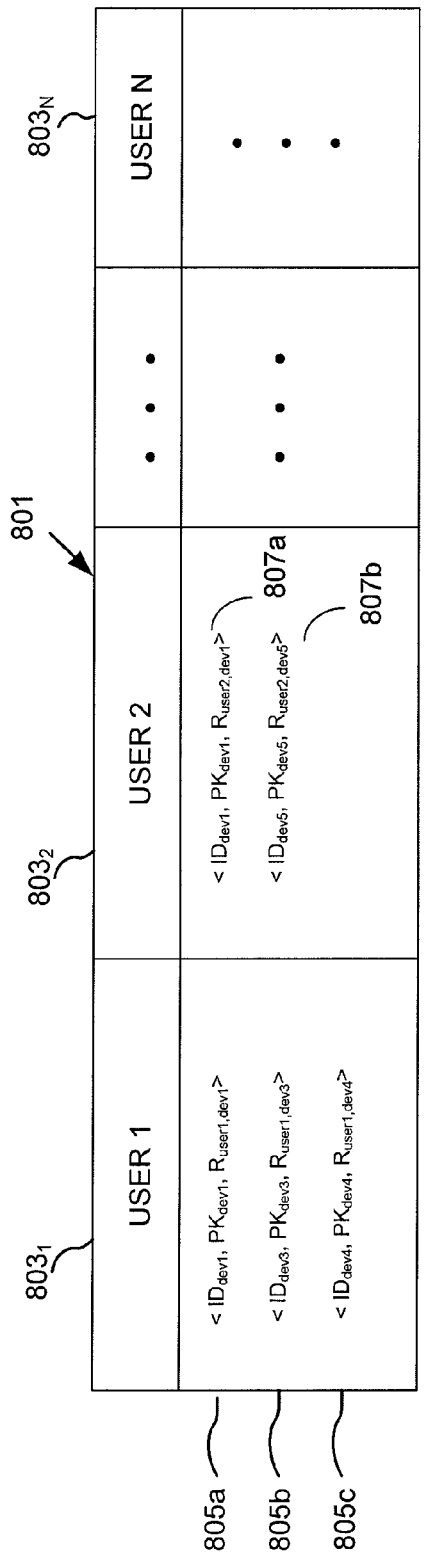
FIG. 8 illustrates an exemplary implementation of a data store including authentication information for a plurality of users and portable devices in accordance with one embodiment of the present invention.

FIG. 8 illustrates an exemplary configuration of the globally accessible data store 801, for storing device profiles established for a plurality of users (user1 through userN) using the protocol and information illustrated in FIG. 7. As mentioned above, these profiles are merely illustrative, so that the globally accessible data store may be organized in other ways to store other types of information. In the embodiment illustrated in FIG. 8, each user has the capability of being associated with multiple devices. For example, the information stored and associated with user1 includes three entries 805a-c that each corresponds to a different device associated with user1. For example, the entries 805a-c may correspond to a mobile phone, MP3 player and set of wireless headphones all belonging to the same user, although these are merely examples, as the portable device(s) associated with the user can be any suitable portable device(s).

It should be appreciated that a same portable device may be shared by multiple users. Therefore, in accordance with one embodiment of the invention illustrated in FIG. 8, a same device may be associated with multiple users in the data store 801. This is shown, for example, by the device identified by the identifier $ID_{dev1}$ being associated with user1 by an entry 805a and further associated with user2 by an entry 807a.

As can be seen in FIG. 8, in accordance with one embodiment, the entries 805a and 807a are not identical, as the values that identify the associations between the users and the portable device are different (i.e., $R_{user1,dev1}$ and $R_{user2,dev1}$).

The use of distinct values that identify the associations between a particular user and a particular device can be used, in accordance with one embodiment of the present invention, to protect against potential replay attacks by an untrusted user. In this respect, it should be appreciated that the techniques described herein can be employed with computers and other devices that may be shared by multiple users. Thus, in accordance with one embodiment of the present invention, the use of a unique value identifying an association between a user and a portable device can be employed to prevent replay attacks orchestrated by an untrusted user. Such attacks could take either or several forms. For example, as should be appreciated from the foregoing, in the process of exchanging authentication information between a computer and a particular portable device (referred to as device1 in this example), device1 will receive the information that the computer sends to authenticate the identity of the user logged on to the computer (e.g., the $ID_{user}$ signed by a key associated with the user). Thus, that information may be stored on the portable device (e.g., device1 in this example). If another user were to gain control of that portable device (e.g., device1), there is a risk that the user could cause that portable device to replay the information received from the computer so that the portable device can essentially spoof that it is a computer logged into by the first user (e.g., user1) and seek to automatically associate with another device (e.g., device2) as user1, when in fact the portable device is under the control of a different user (e.g., user2).

It should be appreciated that a similar risk exists that a computer that engages in the exchange of information to authenticate a portable device will receive the information that the portable device uses to authenticate itself (e.g., the unique identifier for the portable device signed by a key of the portable device) and that this information can be stored on the computer and potentially be replayed by the computer to spoof the identity of the portable device when seeking to form an association with another computer or other type of device at which a user other than user1 is logged in (e.g., user2). For example, in the process of exchanging authentication information between the computer and device1, the computer will receive the information that device1 sends to authenticate itself (e.g., the $ID_{dev}$ signed by a key associated with dev1). Thus, that information may be stored on the computer. If an adversarial entity were to gain control of that computer, there is a risk that the adversarial entity could cause that computer to replay the information received from device1 so that the computer can essentially spoof that it is device1 and seek to automatically associate with another user (e.g., user2) as device1.

In accordance with one embodiment of the present invention, the inclusion in the authentication information exchanged between devices of a value that uniquely identifies an association between a particular user and a particular device prevents replay attacks of the type discussed above.

For example, for a device to properly authenticate a communication received from a computer that purportedly has a particular user logged into it, a device will check to ensure that it receives a specific unique value identifying an association between itself (i.e., the specific device) and the user. Therefore, while a device receiving the authentication information from a computer has all of the information that it needs to authenticate the identity of the user logged into the computer, it does not receive the information that any other device would need to authenticate the user, because each device has its own unique value relating to the association between itself and the user. Therefore, a device receiving the authentication information from a user (e.g., the device1 in the example above) cannot successfully spoof the identity of a computer having the user logged into it to associate with another device (e.g., device2 in the example above), because the device attempting such a replay attack does not possess the particular value that the other device (e.g., device2) will expect to receive to authenticate the identity of the user.

Similarly, the use of a value that specifically identifies the association between a particular user and a particular device can be employed to prevent a computer that received the authentication information from any device (e.g., device1) to associate with a logged in user from attempting to spoof the identity of that device and form an association with another computer or other device at which a different user is logged in. For example, for a computer to properly authenticate a communication received from a portable device purportedly associated with a user logged into the computer, the computer will check to ensure that it receives a specific unique value identifying an association between the portable device and the user logged into the computer. Therefore, while a computer receiving the authentication information from a portable device to associate with a first user has all of the information that it needs to authenticate the identity of the portable device to the first user, it does not receive the information that needs to be presented to authenticate the portable device to a second user, because each user has a unique value relating to the association between the each user and the portable device. Therefore, a computer receiving the authentication information from a portable device (e.g., the device1 in the example above) to associate with a first user (e.g., user1 in the example above) cannot successfully spoof the identity of device1 to associate with another computer having another user logged into it (e.g., user2 in the example above), because the computer attempting such a replay attack does not possess the particular value that the other user (e.g., user2) will expect to receive to authenticate the identity of the portable device.

In one embodiment, the values uniquely identifying the associations are stored in one or more safe and tamper-proof locations. Alternatively, the values may be stored in encrypted form, while the decryption keys are stored in one or more safe and tamper-proof locations.

Further, it should be appreciated that other types of information may be stored in the globally accessible store instead of, or in addition to, the profiles described above. For instance, the user's public and secret keys that are used in the protocol shown in FIG. 11 may be stored in the globally accessible store. However, this is not required, as the user may retrieve the public and secret keys from other storage locations, e.g., in a local storage location on the computer at which the user is logged in.

Figure 9:
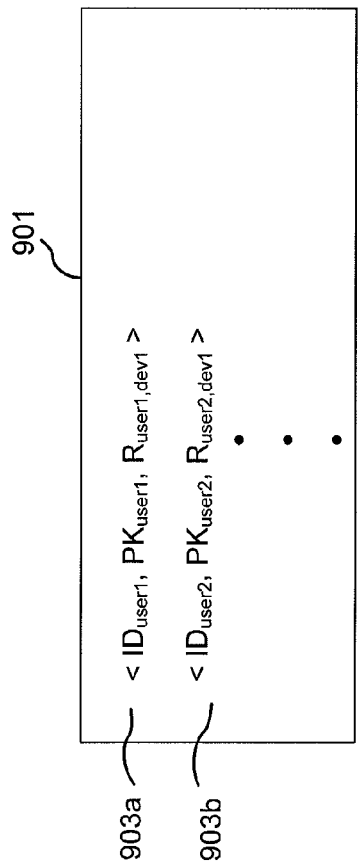
FIG. 9 illustrates an exemplary implementation of a data store on a portable device that includes information to authenticate the portable device to a computer based upon an identity of the user of the computer.

FIG. 9 illustrates an exemplary configuration of the memory of a portable device, comprising a plurality of profiles 903a-b established for users of the portable device. Although only two profiles 903a-b are shown in FIG. 9, it should be appreciated that any suitable number of profiles may be stored. Each profile may correspond to a different user of the portable device, or a user may define multiple profiles for use in different contexts so that the same individual may be recognized by the system as different users (e.g., by different user IDs). In an exemplary scenario, a user may use $ID_{user1}$ to log into one or more home computers and $ID_{user2}$ to log into one or more work computers. Having both profiles stored on the portable device, one for $ID_{user1}$ and another for $ID_{user2}$, allows the portable device to associate automatically with any computer at which the user is logged in using either of the user's IDs. It should be appreciated that the invention is not limited to the number of users that may be simultaneously associated with a portable device. In some embodiments, the portable device may allow association with only one user at a time, while in other embodiments the portable devices may allow association with more than one user at a time (e.g., the portable device may have an upper limit on the number of users with whom the portable device may associate simultaneously).

Again, it should be appreciated that other types of information may be stored in the memory of the portable device instead of, or in addition to, the profiles shown in FIG. 9. For instance, the portable device's public and secret keys that are used in the protocol shown in FIG. 11 may be stored.

Figure 10:
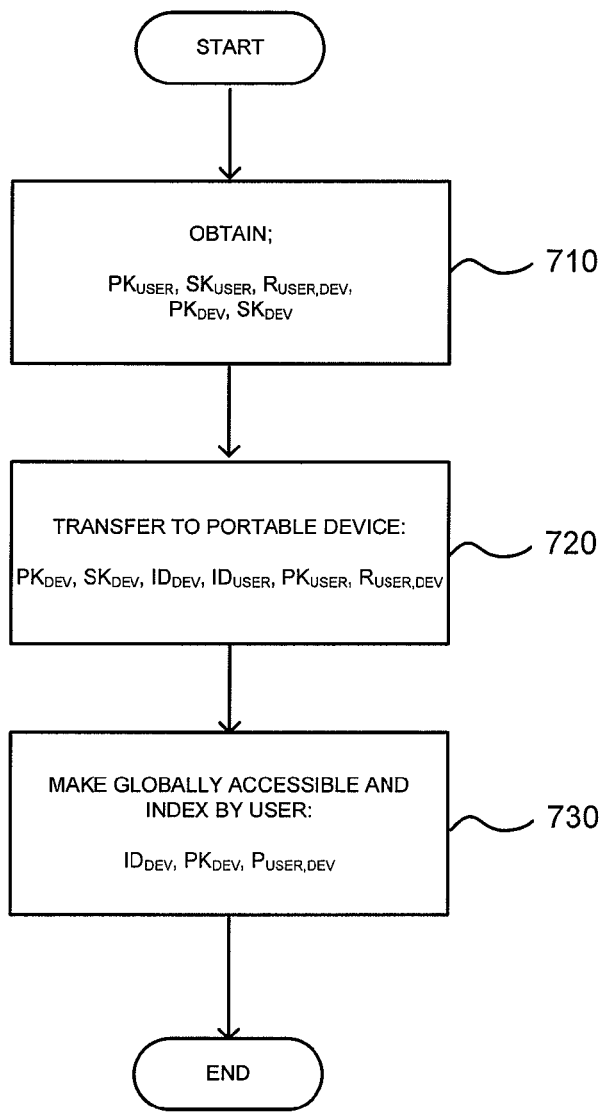
FIG. 10 illustrates a process for obtaining profiles for authenticating a portable device and a computer in accordance with one embodiment of the present invention.

Once the profiles are established and stored in the portable device and a globally accessible data store (as used herein, the reference to the data store being globally accessible means that the data store is not tied to a single computer and can be accessed by two or more different computers), the information contained therein can be used to mutually authenticate the portable device and a computer and facilitate automatic association using any suitable technique, examples of which are discussed below. However, it should be appreciated that the profile information (or any other type of secret or keying materials that can be used for authentication purposes as discussed above) may be formed in ways other than by using the manual pairing process of FIG. 7. For example, as discussed above, in accordance with one embodiment of the present invention, the secret information can be established without going through a manual pairing operation between the portable device and any computer. An exemplary process of this type is shown in FIG. 10 for use with the particular profiles discussed above in connection with FIGS. 8 and 9. However, it should be appreciated that the aspect of the present invention that enables the formation of keying materials without manual pairing is not limited to use with the specific types of keying materials included in the profiles shown in FIGS. 8 and 9.

In the process of FIG. 10, keying materials that include a public-private key pair and a random value are obtained for the user and for the portable device in act 710. The public-private key pairs and the random numbers may be newly generated in act 710, or pre-existing public-private key and random number values may be retrieved. Any suitable computing device(s) may be used to obtain the keying materials, as the invention is not limited in this respect.

In act 720, the portion(s) of the keying materials to be stored on the portable device are transferred to the portable device in any suitable way (e.g., from a computer that has the keying materials and communicates them to the portable device over a wired or wireless connection, via a portable computer readable medium that can be attached to the portable device to download the keying information, etc.). The stored information can include the information that the portable device provides to a computer to authenticate itself, (e.g., $ID_{dev}$, $PK_{dev}$ and $R_{user,dev}$), a private key (e.g., $SK_{dev}$) for the device that forms a public-private key pair with the public key transferred to the computers with which the device may automatically associate and, for each user of the portable device, information that is expected to be transferred from a computer to the portable device to enable the portable device to authenticate the computer or a user thereof (e.g., the $ID_{user}$, $PK_{user}$, $R_{user,dev}$).

In act 730, the information used by a computer to authenticate a portable device and enable automatic association is stored in a globally accessible data store and is associated with the user (e.g., as shown in FIG. 8). Thus, in the embodiment shown in FIG. 8, the device profile <$ID_{dev}$, $PK_{dev}$, $R_{user,dev}$> is stored for each device associated with a user.

It should be appreciated that the acts 710, 720 and 730 may be performed in any logically consistent order and each can be decomposed into multiple acts, and those acts may be interleaved or performed in any logically consistent order. In addition, as discussed above, the specific keying information illustrated in FIG. 8 is merely illustrative, as other embodiments of the present invention can be employed that use different keying information.

Figure 11:
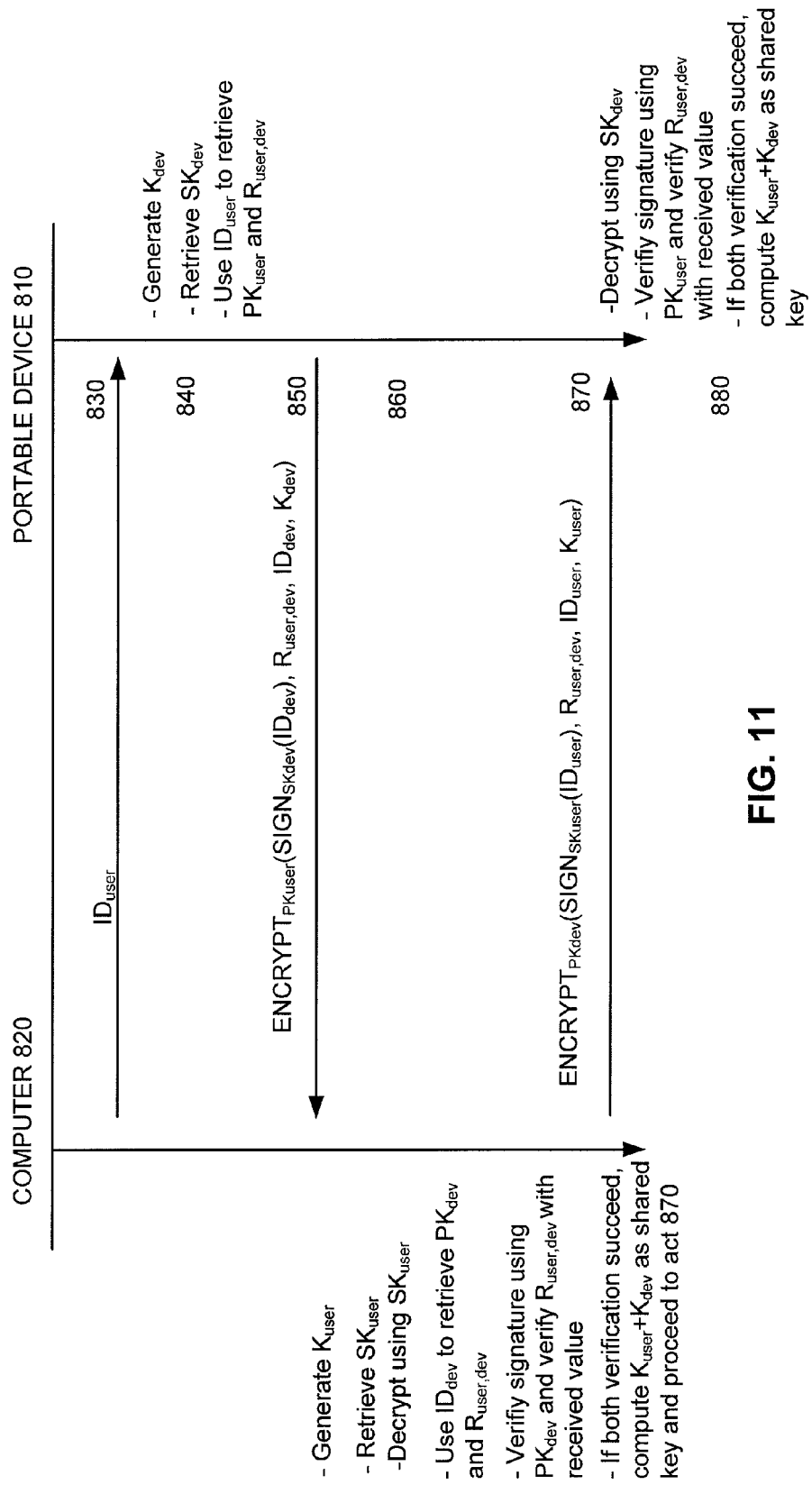
FIG. 11 is a diagram illustrating an example of a protocol for communicating between a computer and a portable device to mutually authenticate the computer and the portable device and enable automatic association between them in accordance with one embodiment of the present invention.

FIG. 11 illustrates an exemplary protocol by which a computer and a portable device that have not previously been manually paired can authenticate one another to establish a trusted relationship that facilitates automatic association in accordance with one embodiment of the invention. In particular, having successfully executed the protocol of FIG. 11, the portable device 810 will have proven to the computer 820 that the portable device 820 is in fact the device it purports to be (i.e., a device identified by the identifier $ID_{dev}$), and the computer 820 will have verified that connection to the device identified by $ID_{dev}$ is accepted by a user identified by $ID_{user}$. In addition, the computer 820 will have proven to the portable device that the computer 820 is being used by the user identified by $ID_{user}$, and the portable device 810 will have verified that the user identified by $ID_{user}$ is among the users with whom the portable device 810 accepts automatic connections.

As with the process illustrated in FIG. 7, the protocol of FIG. 11 may be carried out after the portable device 810 and computer 820 have discovered each other and have established a communication channel in any suitable way. However, it should be appreciated that the communications illustrated in FIG. 11 may be performed during discovery and communication establishment, or during any suitable phase of communication between the portable device 810 and computer 820, as the embodiment illustrated in FIG. 11 is not limited in this respect.

FIG. 11 illustrates an exemplary protocol that the portable device 810 and computer 820 can use to authenticate each other using previously established profiles of the types illustrated in FIGS. 8-9. It should be appreciated that the present invention is not limited to use with profiles of the types illustrated in FIGS. 8-9 to enable mutual authentication between a computer and a portable device, as any suitable types of profiles may be used to authenticate the portable device to the computer and/or the computer to the portable device. Furthermore, the protocol of FIG. 11 leads to the establishment of a shared key between the portable device 810 and computer 820. This shared key may be used, directly or indirectly, to obtain a symmetric encryption key for encrypting and decrypting communications between the portable device 810 and computer 820. However, the invention is not limited to the establishment of any particular type of keying materials to enable secure communication once a trusted relationship has been established, or even to use in systems that do not secure the communications once a trusted relationship is established.

In act 830, the computer 820 notifies the portable device 810 of the identity of the user with whom the portable device 810 is to be associated (e.g., based on the identity of a user logged into computer 820). In act 840, portable device 810 uses the information identifying the user (e.g., $ID_{user}$) received in act 830 to retrieve (e.g., from its memory) the profile that the portable device stores for that user, which includes $PK_{user}$ and $R_{user,dev}$ in the example shown. If a profile associated with $ID_{user}$ cannot be located, indicating that the portable device does not currently accept connection with the user identified by $ID_{user}$, the portable device 810 may refuse connection, e.g. by terminating the protocol. Alternatively, the portable device may initiate a manual pairing procedure (not shown). If a profile for the user can be located, information is retrieved from the profile so that it can be used, along with the secret key $SK_{dev}$ of the portable device 810, to provide a secret back to the computer 820 during act 850 to authenticate the portable device 810 as discussed below. In addition, in the embodiment illustrated in FIG. 11, the information retrieved includes information that enables the portable device 810 to similarly authenticate the computer 820 in the manner discussed below.

In the illustrated embodiment, the secret key $SK_{dev}$ of the portable device 810 is retrieved during act 840. However, the invention is not limited to the time at which the secret key $SK_{dev}$ is retrieved. For instance, the secret key $SK_{dev}$ may be retrieved prior to receiving $ID_{user}$ from the computer 820. Similarly, a fresh key $K_{dev}$ (the use of which is described below) is generated during act 840 in the illustrated embodiment, but it may also be generated prior to act 840, as the invention is not limited in this respect.

In act 850, portable device 810 signs $ID_{dev}$ electronically using $SK_{dev}$ to obtain a first signature (denoted $sign_{SKdev}(ID_{dev})$ in FIG. 11), and assembles a first message comprising: the first signature, $R_{user,dev}$, $ID_{dev}$, and $K_{dev}$. The first message is then encrypted using $PK_{user}$ and sent to the computer 820. The encryption is performed so that only an entity in possession of $SK_{user}$ (i.e., the secret key corresponding to $PK_{user}$) can access the content of the first message. This prevents any other computer within transmission range from capturing the content of the first message, including the first signature. It may be desirable to prevent a third party from capturing the first signature, as the third party may later use the first signature to "impersonate" the portable device 820.

In act 860, the computer 820 generates a fresh key $K_{user}$ (the use of which is described below) and retrieves $SK_{user}$. Again, these two acts may be performed in either order and may be performed prior to act 860, as the invention is not limited in this respect. The computer 820 decrypts the encrypted first message using $SK_{user}$. If the user is in fact the intended recipient of the first message (i.e., the portable device 820 expects to be associated with the user identified by $ID_{user}$, and the portable device 810 used $PK_{user}$ to encrypt the first message so that only a device in possession of $SK_{user}$ can descrypt it), the decryption succeeds and the computer 820 may extract $ID_{dev}$ from the first message. Alternatively, $ID_{dev}$ may be obtained by some other means, e.g., via previous exchanges of information between the portable device 810 and the computer 820. Using $ID_{dev}$, the computer 820 may retrieve the profile <$ID_{dev}$, $PK_{dev}$, $R_{user,dev}$> from the globally accessible store at the location associated with the user identified by $ID_{user}$, so that information contained in the retrieved profile may be used to verify that the portable device 820 is in fact the device it purports to be (i.e., a device identified by the identifier $ID_{dev}$), and that connection with the device identified by $ID_{dev}$ is accepted by the user identified by $ID_{user}$.

In one embodiment, the computer 820 may be required to authenticate with the globally accessible store to access the device profiles established for the user identified by $ID_{user}$. For example, the computer 820 may need to present to the globally accessible store certain user credentials, which may be obtained automatically by the computer 820 at the time the user identified by $ID_{user}$ logs into computer 820. Alternatively, the user identified by $ID_{user}$ may provide the required credentials at some point after logging in.

If a profile associated with $ID_{dev}$ and $ID_{user}$ cannot be located on the globally accessible store, indicating that the user identified by $ID_{user}$ does not currently accept automatic connection with the portable device 810, the computer 820 may refuse connection, e.g., by terminating the protocol. Alternatively, the computer 820 may initiate a manual pairing procedure (not shown).

If the device profile $<ID_{dev}, PK_{dev}, R_{user,dev}>$ can be located on the globally accessible store, the computer 820 retrieves the profile and extracts from it $PK_{dev}$. It then extracts the first signature from the first message and verifies the first signature using $PK_{dev}$. The signature algorithm used to generate the first signature is such that a signature is verified as valid using a public key only if it has been generated using the secret key corresponding to the public key. In the illustrated embodiment, only an entity in possession of $SK_{dev}$ can generate a signature that is verified as valid under $PK_{dev}$. In this way, the portable device 810 proves to the computer 820 that the portable device 820 is in fact the device it purports to be (i.e., a device identified by the identifier $ID_{dev}$).

To prevent replay attacks as discussed above, the computer 820 also checks if the random value received in the message is the same as the value $R_{user,dev}$ retrieved from the globally accessible store.

Thus, if the first signature is valid and the $R_{user,dev}$ value is correct, then the computer 820 trusts the portable device 810 and proceeds to compute a shared key as $K_{dev}+K_{user}$ for reasons discussed below. Otherwise the computer 820 may refuse connection, e.g., by terminating the protocol. Furthermore, if the first signature is valid, the computer 820 signs $ID_{user}$ electronically using $SK_{user}$ to generate a second signature, and may assemble a second message comprising: the second signature (denoted $sign_{SKuser}(ID_{user})$ in FIG. 11), $R_{user,dev}$, $ID_{user}$, and $K_{user}$. The second message is then encrypted using $PK_{dev}$ and sent to portable device 810 in act 870. Again, the encryption is performed so that only an entity in possession of $SK_{dev}$ can access the content of the second message. Otherwise, any computer within transmission range may capture the content of the second message, including the second signature. It may be desirable to prevent a third party from capturing the second signature, as the third party may later use the second signature to "impersonate" the user identified by $ID_{user}$.

In act 880, portable device 810 decrypts the encrypted second message using $SK_{dev}$. The portable device 810 then extracts the second signature from the second message and verifies the second signature using $PK_{user}$. The portable device 810 also checks if the random value received in the message is the same as the value $R_{user,dev}$ retrieved from its memory. If the second signature is valid and the $R_{user,dev}$ value is correct, then the portable device 810 trusts the computer 820 to be authorized by the user identifier by $ID_{user}$, as only an entity in possession of $SK_{user}$ could have generated a signature that is valid as verified using $PK_{user}$ and have obtained the correct $R_{user,dev}$ value. Otherwise, the portable device may refuse connection, e.g., by terminating the protocol.

As should be appreciated from the foregoing, the protocol of FIG. 11 thereby enables a portable device 810 and computer 820 to mutually authenticate one another and establish a trusted relationship, even if the two devices have never been manually paired. Thereafter, the two devices can engage in trusted communication in any desired manner, as the aspects of the present invention described herein are not limited in this respect. In accordance with the embodiment illustrated in FIG. 11, fresh keys $K_{dev}$ and $K_{user}$ were developed as discussed above. In accordance with one embodiment, when the second signature and the $R_{user,dev}$ value are valid, the portable device 810 computes the shared key as $K_{dev}+K_{user}$. At this point, both the computer 820 and portable device 810 have correctly computed $K_{dev}+K_{user}$ as the shared key, which may in turn be used to derive encryption keys for securing the communication channel between the portable device 810 and computer 820. However, it should be appreciated that the aspects of the present invention described herein are not limited to developing a shared key in this manner, as the communication between the computer 820 and portable device 810 can be secured in any suitable manner, or not secured, as the aspects of the present invention described herein are not limited in this respect.

It should be appreciated that the protocol illustrated in FIG. 11 may be performed automatically by the portable device 810 and computer 820, without the user's intervention. For instance, computer 820 may perform act 830 automatically upon discovering the portable device 810 and establishing a communication channel with the portable device 810. Act 860 may also be performed automatically, provided the computer 820 has access to the credentials used to retrieve device profiles from the globally accessible store.

Furthermore, acts 830-880 may be performed in any suitable ordering, including decomposing into multiple acts and interleaving the multiple acts in any suitable ordering.

Figure 12:
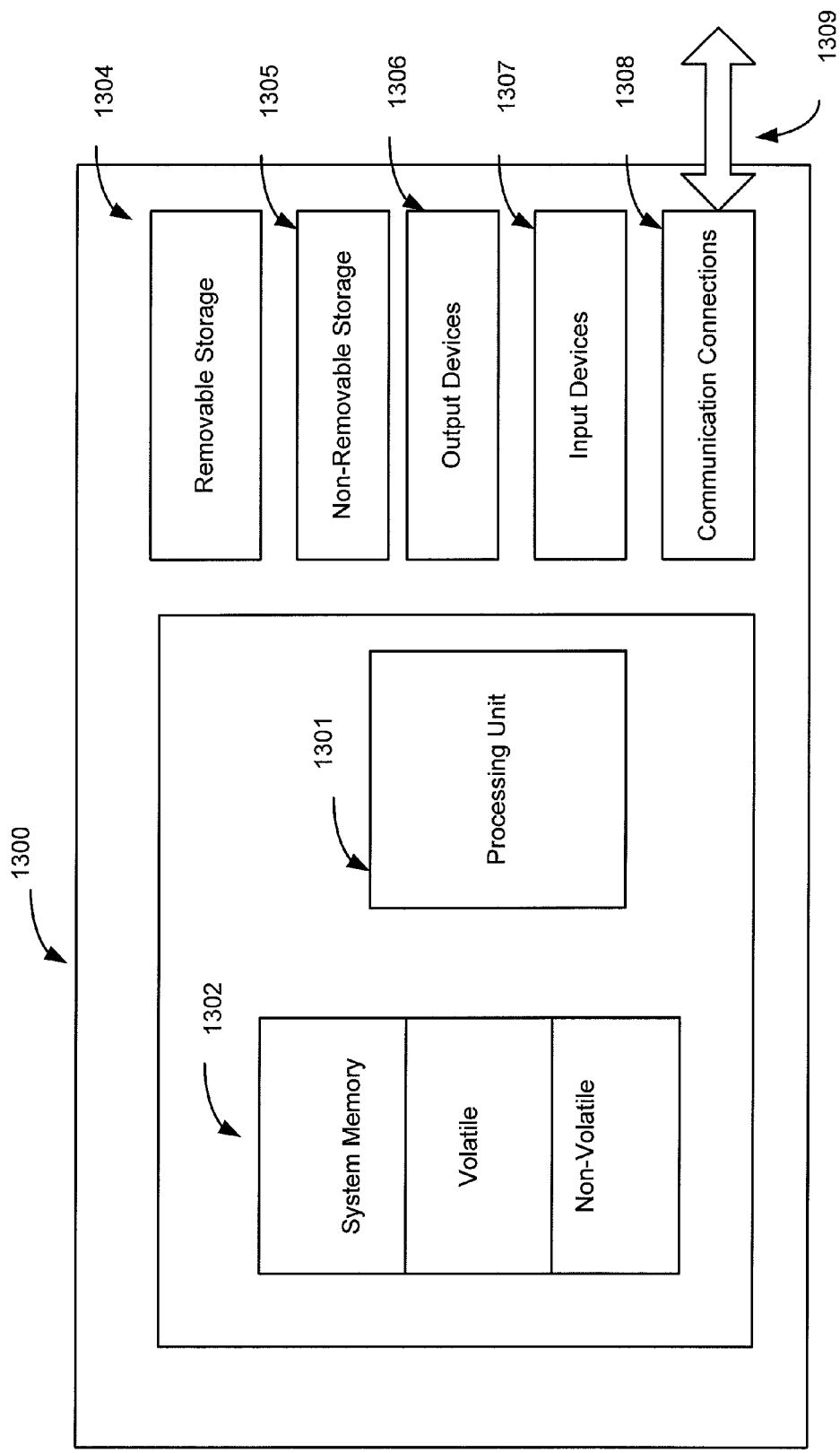
FIG. 12 is a schematic illustration of an exemplary computer, on which aspects of the present invention may be implemented.

As discussed above, the aspects of the present invention described herein can be used with any computer or device having a processor that may be programmed to take any of the actions described above. FIG. 12 is a schematic illustration of an exemplary computer 1300 on which aspects of the present invention may be implemented. The computer 1300 includes a processor or processing unit 1301 and a memory 1302 that can include both volatile and non-volatile memory. The computer 1300 also includes storage (e.g., removable storage 1304 and non-removable storage 1305) in addition to the system memory 1302. The memory 1302 can store one or more instructions to program the processing unit 1301 to perform any of the functions described herein. As mentioned above, the reference herein to a computer can include any device having a programmed processor, including a rack-mounted computer, a desktop computer, a laptop computer, a tablet computer or any of numerous devices that may not generally be regarded as a computer, which include a programmed processor (e.g., a PDA, an MP3 Player, a mobile telephone, wireless headphones, etc.).

Also, a computer may have one or more input and output devices, such as devices 1306-1307 illustrated in FIG. 13. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, some aspects of the invention described herein may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage media) encoded with one or more programs that, when executed on one or more processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or processor to implement various aspects of the present invention as discussed above, and may include any computer program microcode, etc. Additionally, it should be appreciated that one or more computer programs that when executed perform methods of the present invention need not reside on a single computer or processor, but may be distributed amongst a number of different computers or processors to implement various aspects of the present invention.

Computer-executable instructions may be in many forms, such as program modules, executed by one or more computers or other devices. Program modules may include routines, programs, objects, components, data structures, etc. that perform particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in any suitable arrangement or combination, including those not specifically discussed in the foregoing. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art. Such alterations, modifications, and improvements are intended to be within the spirit and scope of the invention. Accordingly, the foregoing description and drawings are by way of example only.

The invention claimed is:

1. A method for use with a portable device capable of being associated with each of a plurality of computers, the plurality of computers comprising at least a first computer and a second computer, the method comprising:

creating authentication information for use by the portable device to authenticate the portable device to each of the plurality of computers, the authentication information including information created during a previous manual pairing process between the portable device and the first computer; and storing the authentication information in a store in a manner that associates the authentication information with a user of the portable device, the stored authentication information being accessible, via a network, for retrieval by each of the plurality of computers to authenticate the portable device for use with each of the plurality of computers.

2. The method of claim 1, wherein the portable device is a wireless device.

3. The method of claim 1, wherein the portable device comprises a first portable device, the user of the first portable device comprises a first user, the authentication information comprises first authentication information, and the first authentication information is accessible by each of the plurality of computers based at least in part on information identifying the first user.

4. The method of claim 3, wherein the store comprises additional information that authenticates other portable devices and is associated with users other than the first user.

5. The method of claim 3, wherein the information identifying the first user is obtained automatically by each of the plurality of computers by, at least in part, the computer identifying the first user as being logged into the computer.

6. The method of claim 1, the store being maintained in a device distinct from the portable device and any of the plurality of computers.

7. The method of claim 1, wherein the storing comprises storing the authentication information in the store in response to a user previously manually pairing the portable device to the first computer.

8. The method of claim 1, wherein the portable device comprises wireless headphones.

9. A computer comprising at least one processor programmed to, in response to discovery of a portable device that is not yet associated with the computer:

identify a user logged into the computer;
use information identifying the user to retrieve authentication information associated with the portable device and the user;
use the retrieved authentication information to authenticate the portable device to the computer, wherein the retrieved authentication information is used to determine information expected to be presented by the portable device to authenticate the portable device to the computer, the authentication information including information exchanged between the portable device and an additional computer when the portable device was previously manually paired with the additional computer; and
in response to the portable device being authenticated using the retrieved authentication information, automatically associate the portable device with the computer.

10. The computer of claim 9, wherein the at least one processor is programmed to retrieve the authentication information from a store that is accessible by a plurality of computers.

11. The computer of claim 10, wherein the portable device comprises a first portable device, the user of the first portable device comprises a first user, the authentication information comprises first authentication information, and the store comprises additional information that authenticates other portable devices and is associated with users other than the first user.

12. The computer of claim 9, wherein the information exchanged between the portable device and the additional computer when previously manually pairing the portable device to the additional computer comprises information created when previously manually pairing the portable device to the additional computer.

13. The computer of claim 9, wherein the portable device is configured for association with more than one user.

14. A method comprising:
accessing, from a store via a first computer, authentication information that authenticates a wireless device to the first computer and to a second computer, the authentication information being stored in the store in a manner that is associated with a user and in response to the wireless device having been previously manually paired with the second computer, the authentication information including information exchanged between the wireless device and the second computer when the wireless device was previously manually paired with the second computer;
using the authentication information to automatically associate the wireless device with the first computer.

15. The method of claim 14, wherein the accessing and the using are performed automatically in response to discovery by the first computer of the wireless device.

16. The method of claim 14, wherein the wireless device comprises a first portable device, the user of the first portable device comprises a first user, the authentication information comprises first authentication information, and wherein the accessing comprises using information identifying the first user to access the first authentication information from the store.

17. The method of claim 16, wherein the information identifying the first user is obtained automatically by the first computer by, at least in part, identifying the first user as being logged into the first computer.

18. The method of claim 14, wherein the wireless device comprises a first portable device, the user of the first portable device comprises a first user, the authentication information comprises first authentication information, and the store comprises additional information that authenticates other portable devices and is associated with users other than the first user, and wherein the accessing comprises using information associated with the first user to access the first authentication information from the store.

19. The method of claim 14, wherein:
the store is maintained via a server accessible to the first and second computers via the Internet; and
the accessing comprises accessing the authentication information from the store over the Internet via the first computer.

20. The method of claim 14, wherein the information exchanged between the wireless device and the second computer when the wireless device was previously manually paired with the second computer comprises information created when the wireless device was previously manually paired with the second computer.

* * * * *